United States Patent [19]

Hernandez

[11] 3,808,378

[45] Apr. 30, 1974

[54] LINE CIRCUIT FOR TELEPHONE INSTALLATION

[75] Inventor: Philippe Henri Hernandez, Nice, France

[73] Assignee: International Business Machines Corporation, Armonk, N.Y.

[22] Filed: May 16, 1972

[21] Appl. No.: 253,718

[30] Foreign Application Priority Data

May 19, 1971 France ............................ 71.19835

[52] U.S. Cl. ............................ 179/84 A, 179/18 FA

[51] Int. Cl. ............................................ H04m 3/22

[58] Field of Search ........... 179/84 A, 84 R, 18 HB, 179/18 FA, 16 AA, 16 F

[56] References Cited

UNITED STATES PATENTS 3,683,118 8/1972 Vago et al. .................... 179/18 HB

*Primary Examiner*—Thomas W. Brown

*Attorney, Agent, or Firm*—Frederick D. Poag

[57] ABSTRACT

A line circuit for a telephone installation has a pair of controlled diode gates admitting alternate half cycles of ringing current derived from respective source buses. An AC ringing voltage superimposed on a DC voltage is applied continuously across the buses. Each side of the line circuit includes a path from its bus through its gate, a resistor, the ringing detector of the telephone, a diode, and another resistor to the opposite pole of the DC source, in symmetrical fashion. The polarities of the DC and AC voltages active in the two sides are chosen to minimize excursions with respect to ground. The voice current is detected across the last named resistor of one side of the circuit and a companion resistor inserted in the other side, utilizing an AND detector which latches as an OR circuit, for longitudinal noise protection.

10 Claims, 8 Drawing Figures

LINE CIRCUIT FOR TELEPHONE INSTALLATION

This invention relates to a line circuit for a telephone installation mainly using electronic components for transmitting ring signals and for detecting loop current.

One object of this invention is to supply an entirely balanced line circuit either during ring signal transmission or in closed loop condition.

Another object of this invention is to allow a very reliable detection of the loop direct current: in open loop condition, detection is performed by symmetrical detectors operating in conjunction mode, which allows alternating current to be eliminated and the system not to be affected by longitudinal noises; in closed loop condition, the detectors operate in disjunction mode, which makes the circuit unaffected by longitudinal noises while enabling detection of the numbering pulses.

Another object of this invention is to provide protection of the feeder connected to power supply in case of short circuit in the grounding line and, therefore, to limit the power consumed in this case.

Another object of this invention is to obtain a good symmetry of the feeders while offering the possibility of choosing the characteristics of these feeders.

The foregoing and other objects which will appear the embodiments which will be subsequently described, are obtained in a particular embodiment of the invention which will be now briefly described.

In accordance with this embodiment, the ring current is transmitted to the subscriber's set loop circuits through a centralized transformer (common to all circuits), including a primary winding and two secondary windings.

The first secondary winding is provided with a first terminal connected to the ground and with a second terminal connected to a first terminal of the subscriber's set ring detector, through a first controlled rectifier and a first resistor.

The second secondary winding is provided with a first terminal connected to the negative terminal of the central battery and with a second terminal connected to the second terminal of the subscriber's set ring detector through a second controlled rectifier and a second resistor.

In ringing condition, the control electrodes of the first and second controlled rectifiers are connected to a circuit supplying high frequency pulses, so that these rectifiers become conducting as soon as an appropriate polarity is applied to the extreme terminals thereof.

The subscriber's set loop circuit respectively includes: the ground, a third resistor, a first diode, the voice circuits of the telephone set (the ring detector being connected in parallel to said voice circuits), a second diode, a fourth resistor and the negative terminal of the central battery. The two above-indicated diodes are directly biased with respect to the direction of the DC current flowing in this loop circuit, i.e., from ground to the negative terminal of the battery.

The first terminal of the ring detector is also connected to the anode of a third diode the cathode of which is connected to the ground through a fifth resistor.

A fourth diode is also provided in the positive direction between the cathode of the first controlled rectifier and the cathode of the third diode. A fifth diode is also provided in the positive direction between the cathode of the second controlled rectifier and the cathode of the second diode.

On the first half-wave of the ring current, and when the two controlled rectifiers are supplied with control pulses, the current successively flows from the first secondary winding of the ring transformer through the first controlled rectifier, the first resistor, the ring detector, the second diode and the fourth resistor, to the negative terminal of the central battery. The ring detector is simultaneously charged by the circuit including the fourth diode and the fifth resistor connecting it to the ground.

On the opposite half-wave, the ring current flows from the second secondary winding of the ring transformer through the second controlled rectifier, the second resistor, the ring detector, the third diode and the fifth resistor successively, to the battery ground. The ring detector is simultaneously charged by the circuit including the fifth diode and the fourth resistor connecting it to the negative terminal of the central battery.

The ring current is admitted in an entirely symmetrical manner if identical values have been chosen for the first, second, fourth and fifth resistors.

Concerning the third resistor, only DC loop current flows in it while both DC loop current and ring current flow in the resistor provided in the other branch of the loop circuit, i.e., the fourth resistor. Therefore, it is easy to detect the DC loop current either by a single detector on the third resistor or by two detectors respectively in relation with the third and fourth resistors, operating in conjunction mode. In these conditions, detection is performed in a manner completely independent of the frequency of the ring signal.

Referring to FIGS. 1 to 5, several examples of line circuits for telephone installation of this invention will be described. The embodiments which will be described are within the scope of the invention but should not be considered as the only possible ones.

In the drawings:

FIG. 1 is a schematic diagram of an embodiment of the line circuit of this invention, using a negative polarity battery.

FIGS. 1*a*, 1*b*, 1*c* show the current flow during various operation steps of the circuit of FIG. 1.

Figure 1:
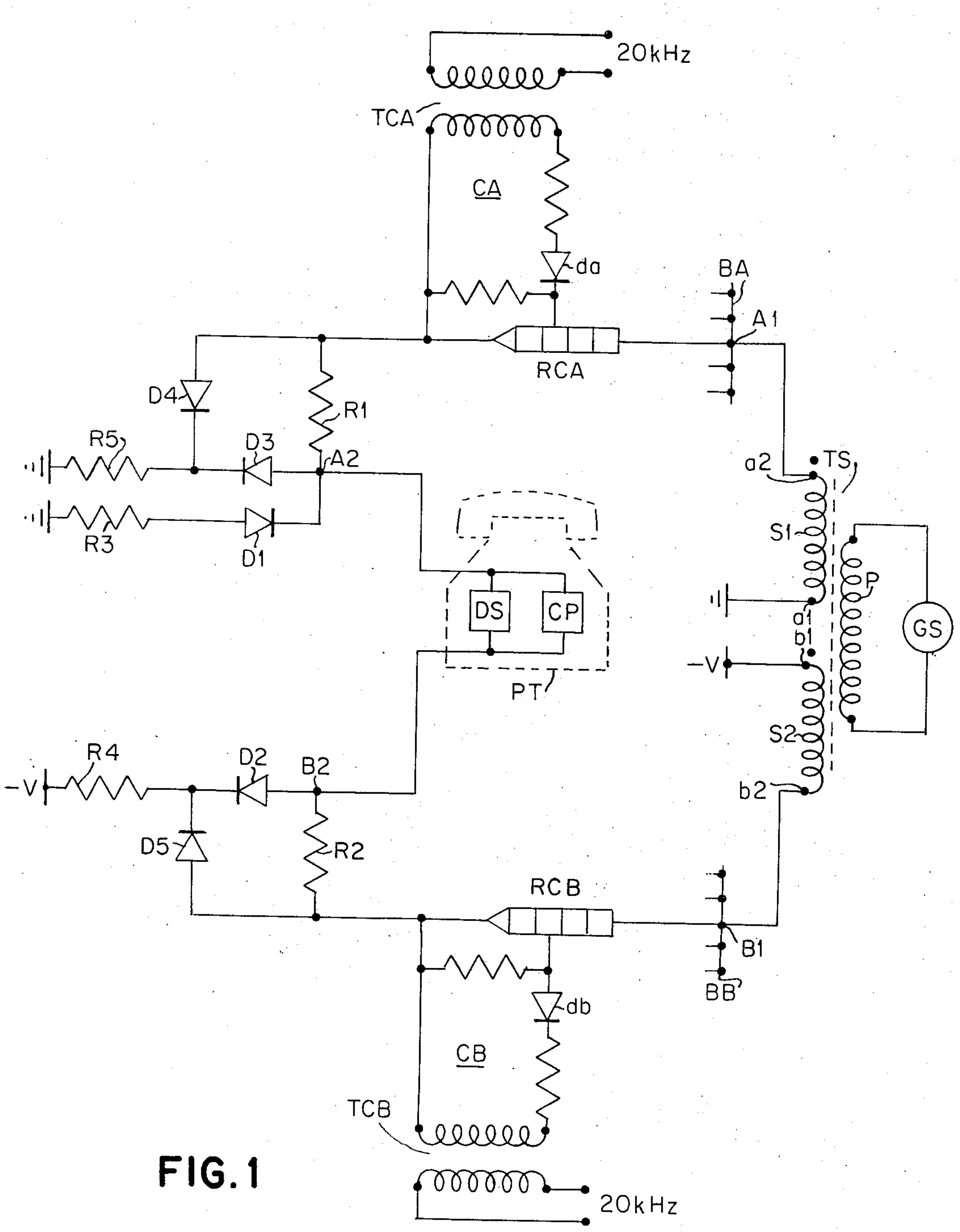

Referring to FIG. 1 of the drawings, a particular embodiment of the line circuit of this invention is schematically illustrated as well as the circuit generating the ring signals. The circuit generating the ring signals mainly consists of a low frequency, for example 20 Hz or 50 Hz, AC current generator GS and of a ring transformer TS. Transformer TS comprises a primary winding P and two secondary windings S1 and S2. First terminal *a*1 of secondary winding S1 is grounded while its second terminal *a*2 is connected, at a point A1, to a bus BA. First terminal *b*1 of secondary winding S2 is connected to negative terminal –V of the central battery while its second terminal *b*2 is connected, at a point B1, to a second bus BB. Buses BA and BB are used for distributing the ring current to each subscriber's set when this is necessary, through line circuits identical to the line circuit which will be subsequently described. Secondary windings S1 and S2 are such that the voltages appearing at points *a*2 and *b*2 are in opposite phase.

Bus BA is connected to a first terminal of ring detector DS of telephone set PT, through a controlled rectifier RCA and a resistor R1. In the same way, bus BB is connected to the other terminal of ring detector DS through a controlled rectifier RCB and a resistor R2.

Controlled rectifier RCA is controlled from a circuit CA which supplies positive pulses at a frequency of 20 kHz to the control electrode. Circuit CA mainly comprises the secondary winding of a transformer TCA the primary winding of which is supplied by a sinusoidal signal at 20 kHz and a diode *da* which allows the transmission of only the positive pulses to the control electrode.

In the same way, controlled rectifier RCB is controlled by using a circuit CB mainly comprising the secondary winding of a transformer TCB and a diode db. The primary winding of transformer TCB supplies a sinusoidal signal at a frequency of 20 kHz and may be combined with the primary winding of transformer TCA. Supplying the primary windings of transformers TCA and TCB is controlled from the central control unit of the telephone system, when ringing should be applied in the concerned line circuit or by any other conventional means. This control may be carried out, in particular, according to the same principles as the ones described in French Pat. No. 1,504,592 and corresponding United Kingdom Pat. No. 1,185,928.

The subscriber's set loop circuit itself mainly comprises a resistor R3, a diode D1, the voice circuit CP of the subscriber's set, a diode D2 and a resistor R4. Resistor R3 is connected to the central battery ground while resistor R4 is connected to negative terminal –V of this battery, so that when the loop is closed, the current flows from the ground to battery terminal –V.

As shown in FIG. 1, one can see that the circuits supplying the ringing current to the subscriber's loop are connected to the latter at points A2 and B2 respectively corresponding to the cathode of diode D1 and to the anode of diode D2.

With reference to FIGS. 1, 1*a*, 1*b*, 1*c* and 2, the operation of the line circuit shown in FIG. 1 will be now described.

Let us assume that telephone set PT is at rest, i.e., its loop circuit is open and that a ringing current should be sent to this subscriber's set. This means that the primary windings of transformers TCA and TCB are supplied with 20 kHz current.

Figure 2:
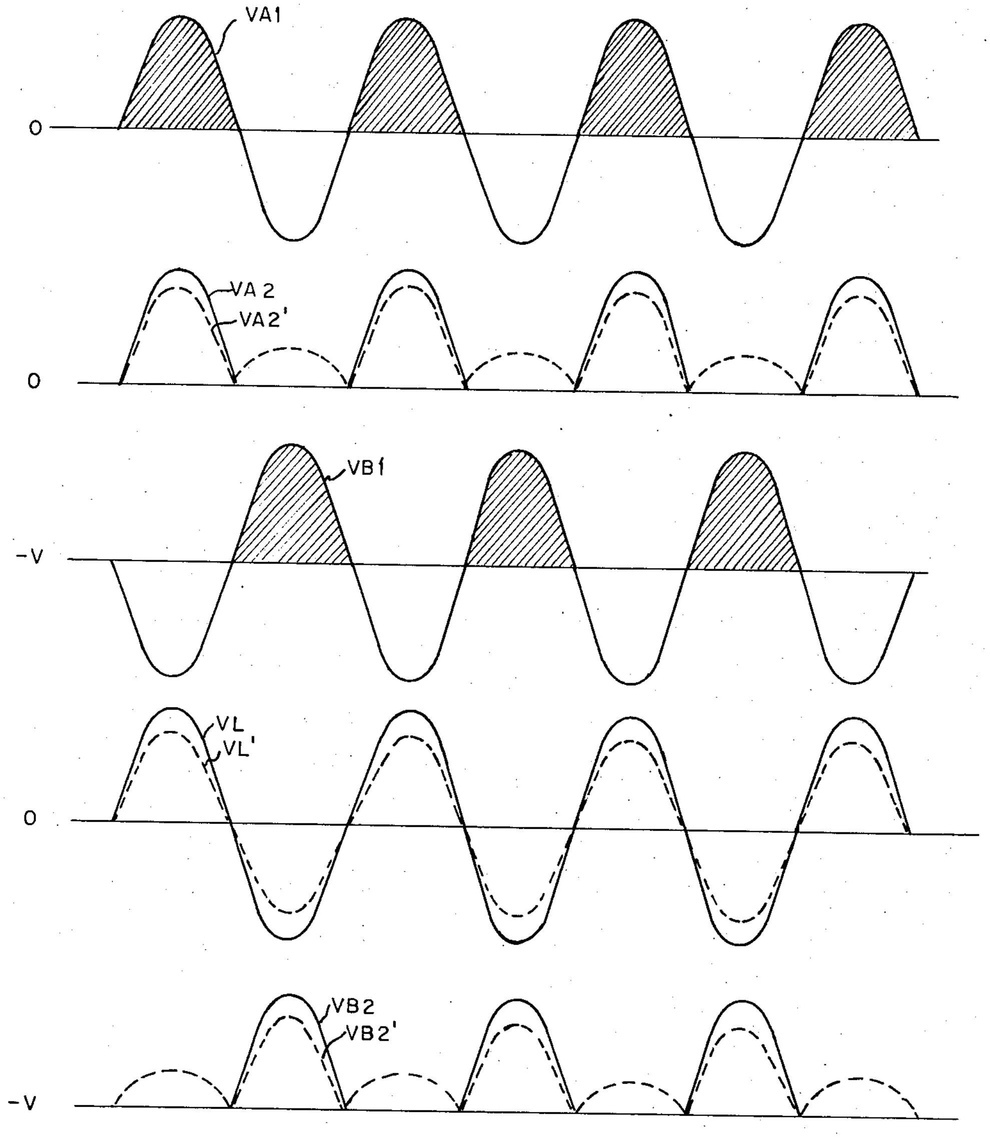
FIG. 2 shows the curves of the voltage variations at various points of the circuit of FIG. 1.

When the positive halfwave with respect to the ground appears on point *a*2 of secondary winding S1 of transformer TS, a current is established from this winding, towards negative terminal –V of the central battery through controlled rectifier RCA, resistor R1, ring detector DS, diode D2 and resistor R4 respectively. Current flows simultaneously through diode D4 and resistor R5 connecting it to the ground. The current flow during this phase has been shown as continuous lines in FIG. 1*a*, the remaining of the circuits being shown in dashed lines. In FIG. 2, the curve shown in VA1 shows the voltage variations at point A1 of the circuit with respect to the ground. In this same figure, curve VA2 shows the voltage variations at point A2 of the circuit, i.e., at one of the terminals of ring detector DS, in unloaded condition. Curve VA2′ shown in dashed line with respect to the same coordinate axis, corresponds to the voltage variation at same point A2 but now, in loaded condition.

The following half-wave of the ring signal generated by generator GS causes a voltage exceeding negative voltage –V of the central battery to appear at point *b*2 of secondary winding S2 of transformer TS. At this time, the ring current is established from winding S2 through controlled rectifier RCB, resistor R2, ring detector DS, diode D3 and resistor R5, to the central battery ground. Ring detector DS is simultaneously charged as well as the circuit including diode D5 and resistor R4 connecting it to terminal –V of the central battery. Voice circuit CP is non-conducting while the telephone PT remains on-hook.

Figure 1C:
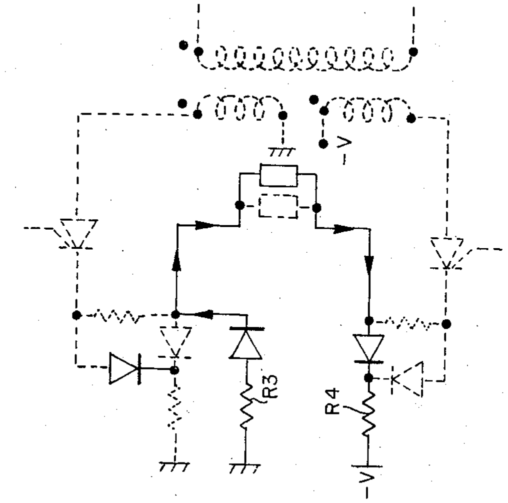
Figure 1B:
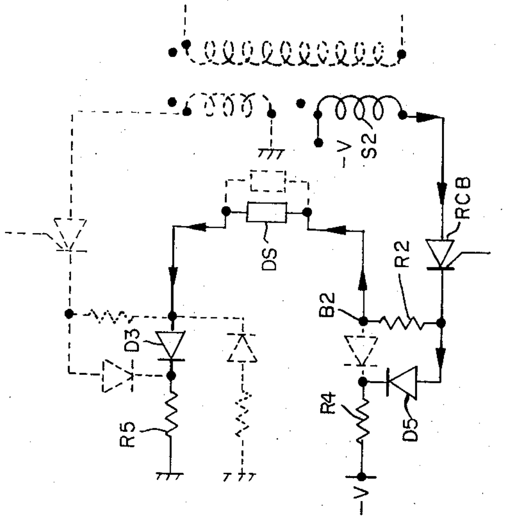
Figure 1A:
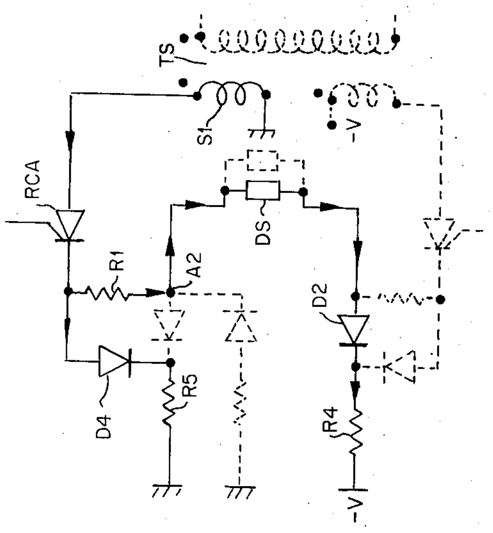

The current flow during this second phase has been shown in continuous lines in FIG. 1*b*, the remaining of the circuits being shown in dashed lines. In FIG. 2, curve VB1 shows voltage variations at point B1 with respect to voltage –V of the central battery. On this same figure, curve VB2 shows the voltage variations with respect to voltage –V of the central battery, at point B2 when in unloaded condition. Curve VB2′ drawn on the same coordinate axis shows the voltage variations at same point B2 but now, in loaded condition.

Should resistors R1, R2, R4 and R5 of equal values be selected, the ring current is generated in an entirely symmetrical manner. Curve VL shown in FIG. 2 shows the voltage variations at the terminals of ring detector DS in unloaded condition, while curve VL′ shown in dashed lines on the same coordinate axis shows the voltage variations at the terminals of this same ring detector but now, in loaded condition.

In FIG. 1*c*, the subscriber's set DC loop current flow is shown in continuous lines, the remaining of the circuits being shown in dashed lines. By comparing this figure with FIGS. 1*a* and 1*b*, it should be noted that only the loop DC current may flow into resistor R3 while loop DC current and ring AC current may flow into resistor R4 which is a part of the subscriber's set loop circuit. Thus, it is easy to detect the loop DC current either through a single detector connected to resistor R3, or through two detectors operating in conjunction and connected to resistors R3 and R4 respectively.

In all cases, detection is performed in a manner completely independent from the frequency of the ring signal.

In addition to the above indicated advantages, this line circuit provides ground-to-wire voltages during ringing, lower than the ones existing in the conventional circuits. Say VL is the wire-to-wire voltage. VC is the DC voltage, VS is the ring voltage, VM is the ground to wire voltage, one obtains:

$$VL_{RMS} = VC + VS_{RMS}$$

Peak-to-peak $VL = VC + \sqrt{2}\, VS_{RMS}$ $$VM_{RMS} = VS_{RMS}\ \sqrt{2}$$

Peak-to peak $VM = \sqrt{2}\, VS_{RMS}$

In the ring systems using conventional relays, these parameters are respectively:

$$VM_{RMS} = VS_{RMS}$$

Peak-to peak $VM = \sqrt{2}\, VS_{RMS}$

Therefore, the line circuit of this invention allows to reduce the RMS ground to wire voltage with respect to the conventional relay emission by a factor equal to $\sqrt{2}$, with control through controlled rectifiers and an easy detection of the loop DC current. In addition, the output AC voltage appearing on the line is purely sinusoidal contrary to the other systems of the prior art also using controlled rectifiers in which the signal on the line is distorted.

Figure 3:
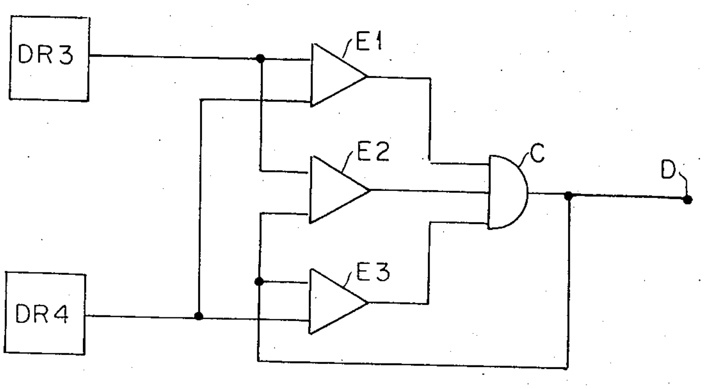
FIG. 3 is a logic diagram enabling the detection of the loop current in the circuit of FIG. 1.

FIG. 3 shows a loop current detection logic circuit including two detectors DR3 and DR4 connected to resistors R3 and R4 respectively. This logic circuit mainly comprises three AND circuits E1, E2, E3 and an OR circuit C. The output of detector DR3 is connected to a first input of AND circuit E1 and to a first input of AND circuit E2. The output of detector DR4 is connected to the second input of AND circuit E1 and to a first input of AND circuit E3. The output of OR circuit C is connected to the second input of AND circuit E2, and to the second input of AND circuit E3. The outputs of the three AND circuits E1, E2 and E3 are connected to the inputs of OR circuit C.

When the loop current is null, detectors DR3 and DR4 do not deliver any output signals and all AND circuits are blocked. Therefore, output D of OR circuit C does not deliver any signal. When DC current flows into the subscriber's loop, detectors DR3 and DR4 deliver output signals which conditions AND circuit E1 and generates a signal on output line D of OR circuit C. The presence of a signal on circuit D conditions the two AND circuits E2 and E3.

Then, a signal will be delivered on output D of OR circuit C as long as both detectors DR3 and DR4 deliver signals at the same time. In effect, if, for example, detector DR3 does not deliver any more signals, AND circuits E1 and E2 are no longer conditioned, but AND circuit E3 remains conditioned and a signal is still delivered on output D of OR circuit C. In the same way, if only circuit DR4 does not deliver any more signals, AND circuits E1 and E3 will be no longer conditioned, but AND circuit E2 will remain conditioned and a signal will still appear on output D. This arrangement enables to eliminate the detection of longitudinal noises induced on open or closed line condition.

Figure 4:
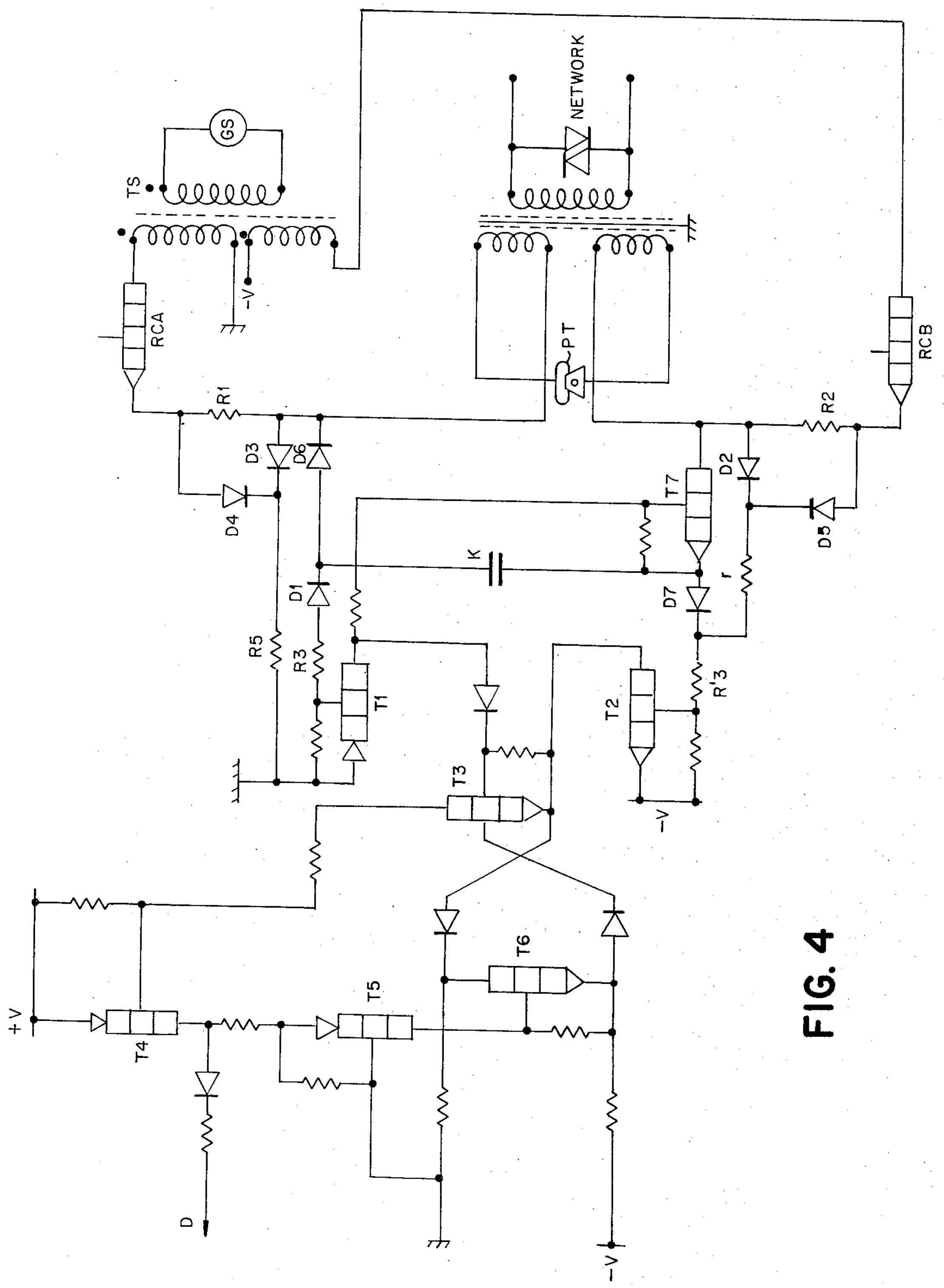
FIG. 4 shows another embodiment of the invention including the subscriber's set loop circuit, the ring circuit and the logic circuit detecting the loop current.

In FIG. 4, the line circuit according to the invention, the ring current feeding circuit and a preferred embodiment of the logic circuit schematically represented in FIG. 3, have been represented together. The elements of this figure corresponding to the elements shown in other figures bear the same reference numbers.

The logic circuit operates as follows:

At rest, transistors T1 and T2 which, in fact, constitute the current detectors previously referenced DR3 and DR4, are blocked as well as transistors T3, T4, T5 and T6. Thus, it is necessary for transistors T1 and T2 to be saturated at the same time to cause transistor T3 to conduct. As soon as this condition is met, transistor T4, then T5, the latter being used as a relay transistor, and at least T6, become saturated. Transistor T3 which was, up to now, used as an AND circuit is now used as an OR circuit for the detectors constituted by transistors T1 and T2.

Since the longitudinal noises are in phase on the two wires with respect to the ground, the detection of said noises is eliminated in open loop condition since transistors T1 and T2 cannot become saturated on the same phase of noise signal. In the same way, the detection of these longitudinal noises is eliminated in closed loop condition by the fact that transistors T1 and T2 cannot be blocked at the same time on the same noise phase, in particular when taking the established DC current into account.

In addition to the presence of the detectors constituted by transistors T1 and T2, one should note that the line circuit shown in FIG. 4 has been slightly modified with respect to the one shown in FIG. 1. These modifications are required by the following conditions. It has been noted above that resistors R1, R2, R4 and R5 shown in FIG. 1 should be of equal values, resistor R3 being of a lower value. If one wants the subscriber's loop circuit to be perfectly balanced when DC current passes through it, then it is necessary to short circuit a section of resistor R4 during the loop current emission so that the resistors located in the two branches of this loop circuit be equal. This is performed in the circuit shown in FIG. 4, in which resistor R'3 has a value equal to the value of resistor R3 and the sum of the values of resistors R'3 and *r* is equal to the value of resistor R5. When resistor T1 detects a loop current, this transistor controls the conduction of transistor T7 which, then, short circuits resistor *r*. At this time, only resistors R3 and R'3, the values of which are equal, are introduced in the loop circuit. An additional advantage of this arrangement is to provide an automatic protection in case of short circuit between the line wire connected to the power supply and the ground. In effect, in this case, there is a short circuit current limitation and a distribution of the power dissipated between resistors R'3 and *r*.

On ringing condition, uncoupling capacitor K of the feeders is isolated by diodes D6 and D7 and transistor T7.

Figure 5:
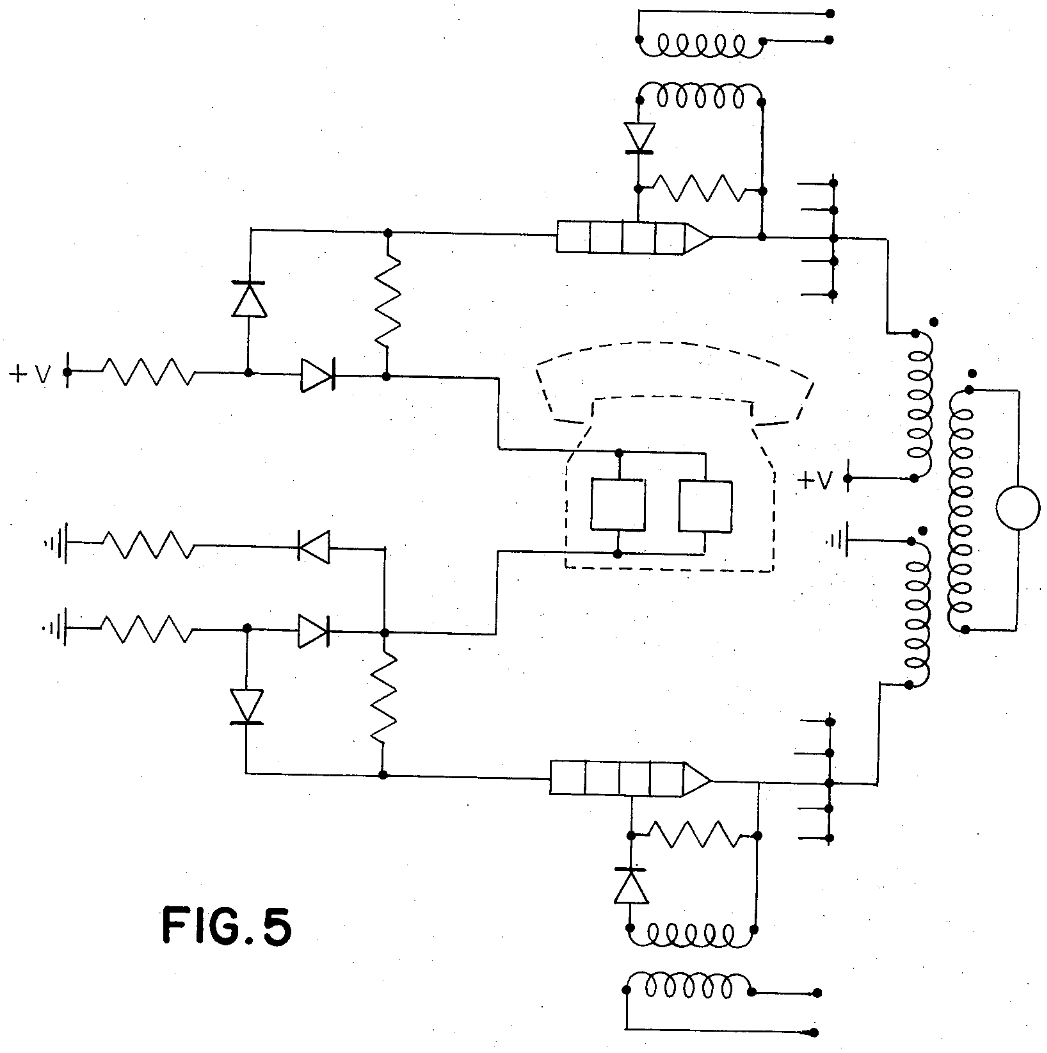
FIG. 5 shows another possible embodiment of the circuit of FIG. 1, in which power supply is provided by a positive polarity battery.

While the various above-described embodiments of the line circuit of this invention use a central battery the polarity of which is negative, it is obvious that other embodiments may be imagined on the basis of a power supply with positive continuous polarity. The resulting changes will not be described in detail since they can easily be done by anybody skilled in the art. However, for example, a line circuit similar to the one shown in FIG. 1 but with a positive central battery polarity has been shown in FIG. 5. The other possible embodiments may be easily imagined from the ones described above and by applying modifications similar to the ones applied on FIG. 5.

While there has been described what are, at present, considered to be the preferred embodiments of the invention, it will be understood that various modifications may be made therein, and it is intended to cover in the appended claims all such modifications as fall within the true spirit and scope of the invention.

What is claimed is:

1. A line circuit for telephone set installation of the type having a subscriber's loop circuit including a DC supply for the telephone set and a ring circuit for said set, with said set including circuit means having first and second terminals for coupling to said loop supply and ring circuit, and in which alternative ring signals are transmitted to the telephone set from a transformer with first and second secondary windings, each of said windings having a first terminal connected to a different said terminal of said circuit means of said set through a controlled rectifying means actuated when the ring current is to be applied to the corresponding set, wherein the second terminal of said first secondary winding is connected to one pole of said supply and the second terminal of said second secondary winding is connected to the other pole of said supply, both windings being arranged so that the signals delivered in the corresponding terminals of said set circuit means are in opposite phase, said subscriber's loop circuit includes a first branch comprising a first resistor and a first diode connected in series between said one pole and said first terminal of said set, and a second branch comprising a second diode and a second resistor connected in series between said second terminal of the set and said other pole, said first and second diodes being biased in the positive direction with respect to the subscriber's loop direct current, and wherein the loop circuit comprises a third branch connected in parallel with one of said first and second branches and including a third diode and a third resistor connected in series within said third branch, said third diode being reversely biased with respect to the loop current.

2. A circuit according to claim 1 wherein one of said poles is a loop supply grounding point and said third branch is connected to said grounding point, and the said controlled rectifying means associated with the transformer secondary connected to the ungrounded pole is biased to conduct ring current during the half cycle of operation of said secondary which subtracts from the potential of said ungrounded pole.

3. A circuit according to claim 1, wherein one said controlled rectifier means is connected to said first terminal of the telephone set circuit means through a fourth resistor and the other said controlled rectifier means is connected to the second terminal of the telephone set circuit means through a fifth resistor.

4. A circuit according to claim 3, wherein the values of said second, third, fourth and fifth resistors are equal.

5. A circuit according to claim 1, further including a fourth diode connected in series between one said controlled rectifier means and said third resistor, and a fifth diode connected in series between the other said controlled rectifier means and said second resistor.

6. A circuit according to claim 1, further including first loop current detector means coupled to said branch of the subscriber's set loop circuit which is in parallel with said third branch to detect the presence of the loop DC current.

7. A circuit according to claim 4, further including first loop current detector means coupled to said branch which is in parallel with said third branch, and in addition, second loop current detector means associated with the other of said first and second branches of the subscriber's set loop circuit, to detect the presence of the loop DC current, and third means responsive to detection signals of said first and second means, delivering a loop current detection signal initially only when said first and second means are energized and thereafter delivering loop current detection signal until said first and second means are both no longer energized.

8. A circuit according to claim 7, wherein said first resistor has a value lower than the values of the four other ones, and in that said second resistor is constituted of first and second parts in series, said first part having a value equal to that of said first resistor, means being provided to short-circuit said second part in the presence of loop current.

9. A circuit according to claim 1 wherein said controlled rectifier means are controlled rectifiers and the control electrodes thereof are controlled by high frequency pulses.

10. A circuit in accordance with claim 8 wherein one of said poles is a loop supply grounding point and said third branch is connected to said grounding point, and the said controlled rectifying means coupled to the transformer secondary connected to the ungrounded pole is biased to conduct ring current during the half cycle of operation of said secondary which subtracts from the potential of said ungrounded pole.

* * * * *